US011809768B2

(12) United States Patent
Asai et al.

(10) Patent No.: US 11,809,768 B2
(45) Date of Patent: Nov. 7, 2023

(54) DISPLAY CONTROL APPARATUS, DISPLAY APPARATUS, DISPLAY CONTROL SYSTEM, AND STORAGE MEDIUM

(71) Applicant: DENSO CORPORATION, Kariya (JP)

(72) Inventors: Toshitaka Asai, Kariya (JP); Mitsuo Tamagaki, Kariya (JP); Yoshitaka Adachi, Kariya (JP); Naoki Yokota, Kariya (JP); Ken Aida, Kariya (JP); Satoshi Katano, Kariya (JP)

(73) Assignee: DENSO CORPORATION, Kariya (JP)

( * ) Notice: Subject to any disclaimer, the term of this patent is extended or adjusted under 35 U.S.C. 154(b) by 108 days.

(21) Appl. No.: 17/469,467

(22) Filed: Sep. 8, 2021

(65) Prior Publication Data
US 2021/0405947 A1 Dec. 30, 2021

Related U.S. Application Data

(63) Continuation of application No. PCT/JP2020/006295, filed on Feb. 18, 2020.

(30) Foreign Application Priority Data

Mar. 13, 2019 (JP) ................................ 2019-045890

(51) Int. Cl.
G06F 3/14 (2006.01)
H04N 5/44 (2011.01)
B60R 16/02 (2006.01)
G09G 5/00 (2006.01)

(52) U.S. Cl.
CPC ............... *G06F 3/14* (2013.01); *B60R 16/02* (2013.01); *G09G 5/006* (2013.01); *H04N 5/44* (2013.01); *G09G 2330/02* (2013.01); *G09G 2380/10* (2013.01)

(58) Field of Classification Search
CPC .......... G06F 3/14; B60R 16/02; G09G 5/006; G09G 2330/02; G09G 2380/10; H04N 5/44
See application file for complete search history.

(56) References Cited

U.S. PATENT DOCUMENTS

2011/0062794 A1 3/2011 Vergoossen et al.
2018/0086346 A1 3/2018 Fujisawa et al.
2018/0118109 A1* 5/2018 Fujisawa ................ G02B 27/01

FOREIGN PATENT DOCUMENTS

| JP | 2004249836 A | 9/2004 |
| JP | 2005081866 A | 3/2005 |
| JP | 2011521600 A | 7/2011 |
| JP | 201456030 A | 3/2014 |
| JP | 2016197407 A | 11/2016 |
| JP | 201920613 A | 2/2019 |

OTHER PUBLICATIONS

U.S. Appl. No. 17/469,307, filed Sep. 8, 2021, Asai et al.
U.S. Appl. No. 17/469,371, filed Sep. 8, 2021, Asai et al.

* cited by examiner

*Primary Examiner* — Abbas I Abdulselam
(74) *Attorney, Agent, or Firm* — Harness, Dickey & Pierce, P.L.C.

(57) ABSTRACT

A display apparatus is configured to activate a display control apparatus by transmitting an activating signal to the display control apparatus in response to determining that a start condition is satisfied. In response to receiving the activating signal, the display control apparatus is enabled to transmit a video data corresponding to a video to be displayed in a display in the display apparatus.

13 Claims, 11 Drawing Sheets

DISPLAY CONTROL APPARATUS, DISPLAY APPARATUS, DISPLAY CONTROL SYSTEM, AND STORAGE MEDIUM

CROSS REFERENCE TO RELATED APPLICATIONS

The present application is a continuation application of International Patent Application No. PCT/JP2020/006295 filed on Feb. 18, 2020, which designated the U.S. and claims the benefit of priority from Japanese Patent Application No. 2019-045890 filed on Mar. 13, 2019. The entire disclosures of all of the above applications are incorporated herein by reference.

TECHNICAL FIELD

The present disclosure relates to a display apparatus, a display control apparatus, a display control system, and a storage medium.

BACKGROUND

There is known a display control system including (i) a display apparatus with a display and (ii) a display control apparatus for controlling a video displayed on the display in the display apparatus.

In this type of display control system, when video data is transmitted from the display control apparatus to the display apparatus, the video corresponding to the video data is displayed on the display apparatus. For example, if the display apparatus is an in-vehicle meter apparatus, video data is transmitted from the display control apparatus to the meter apparatus, so that, for example, videos such as the remaining amount of fuel and the mileage are displayed on the meter apparatus.

SUMMARY

According to an example of the present disclosure, a display apparatus is provided as follows. The display apparatus is configured to activate a display control apparatus by transmitting an activating signal to the display control apparatus in response to determining that a start condition is satisfied. In response to receiving the activating signal, the display control apparatus is enabled to transmit a video data corresponding to a video to be displayed in a display in the display apparatus.

BRIEF DESCRIPTION OF DRAWINGS

The objects, features, and advantages of the present disclosure will become more apparent from the below-described detailed description made with reference to the accompanying drawings.

DETAILED DESCRIPTION

First Embodiment

Figure 1:
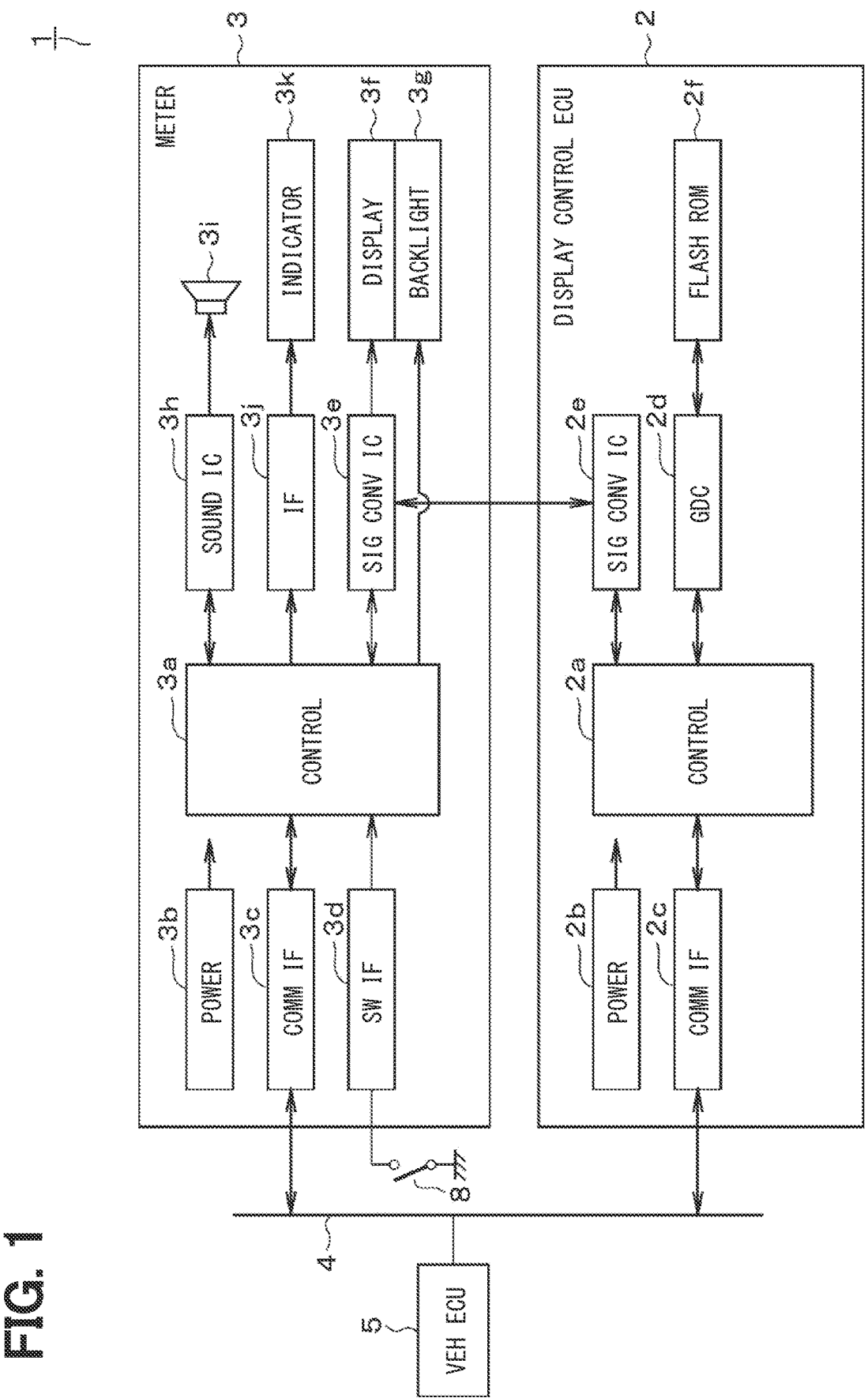
FIG. 1 is a functional block diagram showing an overall configuration of a first embodiment.

A first embodiment will be described with reference to FIG. 1 to FIG. 7. As shown in FIG. 1, a display control system 1 includes a display control ECU (Electronic Control Unit) 2 (corresponding to a display control apparatus) and a meter apparatus 3 (corresponding to a display apparatus) arranged in front of a driver's seat. The display control ECU 2 includes an HMI (Human Machine Interface) function in addition to the display control function, and functions as an HCU (HMI control unit). Further, the display control ECU 2 is connected with the meter apparatus 3 via an in-vehicle network 4 so as to be capable of data communication. Further, the display control ECU 2 and the meter apparatus 3 are connected to a vehicle side ECU 5 via the in-vehicle network 4 so as to be capable of data communication. The in-vehicle network 4 is, for example, CAN (Controller Area Network) (registered trademark) or the like.

The display control ECU 2 controls the display of the video in the meter apparatus 3 by transmitting the video data to the meter apparatus 3. By receiving the video data transmitted from the display control ECU 2, the meter apparatus 3 displays a video related to safety and security such as the remaining amount of fuel and the mileage.

The present embodiment illustrates a configuration in which the display control ECU 2 controls the display of the video on the meter apparatus 3. However, there is no need to be limited thereto. That is, the display control ECU 2 may be connected not only with the meter apparatus 3, but also with a center display apparatus or the like located on the center console between the driver's seat and the passenger seat. Therefore, the display control ECU 2 may be configured to centrally control the display of videos on a plurality of display apparatuses. The display apparatus of which the display videos are controlled by the display control ECU 2 may be a head-up display apparatus, a multi-information display apparatus, a mobile device such as a smartphone or a tablet brought into the vehicle interior, or the like.

Figure 2:
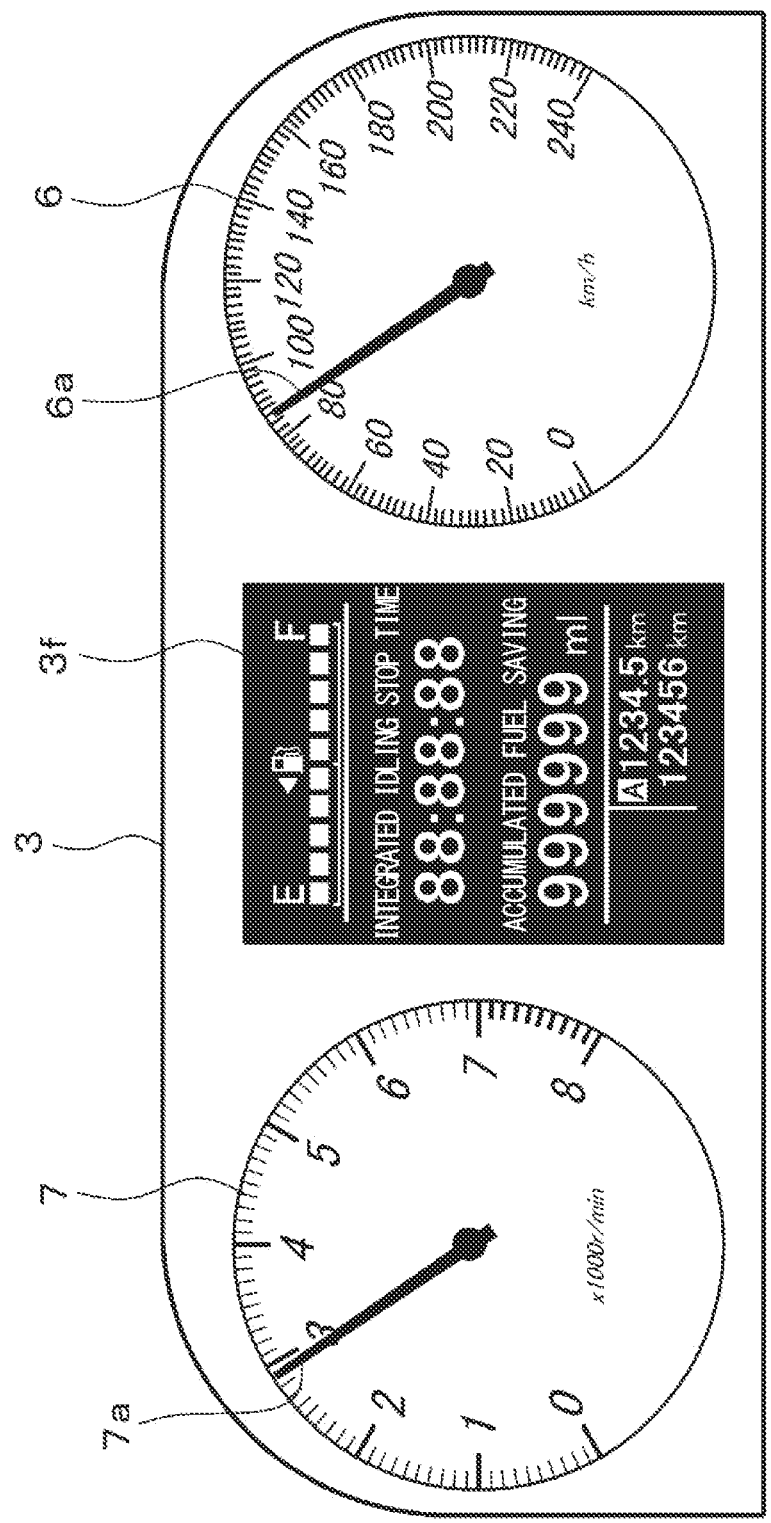
FIG. 2 is a diagram showing a meter apparatus.

As shown in FIG. 2, the meter apparatus 3 includes (i) an analog pointer type vehicle speed meter 6 in which the pointer 6a is rotationally driven in conjunction with the vehicle speed, (ii) an analog pointer type tachometer 7 in which the pointer 7a is rotationally driven in conjunction with the engine speed, and (iii) a display 3f that displays various vehicle states. The display 3f is arranged between the vehicle speed meter 6 and the tachometer 7. In the state where the meter apparatus 3 is activated, the display 3f can display (i) the remaining amount of fuel, (ii) the integrated idling stop time, (iii) the accumulated fuel saving, (iv) the ODO distance (123456 km in the example of FIG. 2), and (v) the TRIP distance (1234.5 km in the example of FIG. 2), as videos. The meter apparatus 3 may have a configuration in which the vehicle speed and the number of rotations can be also displayed by videos, or may have a so-called full display configuration.

The display control ECU 2 includes (i) a controller 2a (which may also be as a controller unit, a first controller, or a first controller unit), (ii) a power supply circuit 2b, (iii) a communication IF unit 2c (which may also be referred to as a communication interface, an activating signal receiver, or an activating signal receiver unit), (iv) a GDC (Graphic Display Controller) 2d, (v) a signal conversion IC (Integrated Circuit) 2e (which may also be referred to as a video data transmitter, a video data transmitter unit, an activating signal receiver, an activating signal receiver unit, or a communication interface), and (vi) a flash ROM (Read Only Memory) 2f. Further, the communication IF unit 2c and the signal conversion IC 2e may each function not only as a receiver receiving data but also as a transmitter transmitting data; namely, the communication IF unit 2c and the signal conversion IC 2e may each function as a transceiver communicating data.

The controller 2a is mainly composed of an MPU (Micro Processing Unit), executes a control program, and controls the overall operation of the display control ECU 2. The control program executed by the controller 2a includes an activation control program. The power supply circuit 2b supplies operating power to each functional block inside the display control ECU 2. The first communication IF unit 2c controls data communication with the meter apparatus 3 via the in-vehicle network 4. The GDC 2e reads the data stored in the flash ROM 2f and processes the read data to generate video data (i.e., drawing data). When the signal conversion IC 2e receives video data from the GDC 2d, the signal conversion IC 2e transmits the received video data to the meter apparatus 3 by LVDS (Low Voltage Differential Signaling) communication. LVDS communication includes GVIF (Gigabit Video Interface), GMSL (Gigabit Multimedia Serial Link), HDMI (High-Definition Multimedia Interface) (registered trademark), Ethernet (registered trademark), and the like.

The meter apparatus 3 includes (i) a controller 3a (which may also be referred to as a controller unit, a second controller, or a second controller unit), (ii) a power supply circuit 3b, (iii) a communication IF unit 3c (which may also referred to as a communication interface, an activating signal transmitter, or an activating signal transmitter unit), (iv) a switch IF unit 3d, (v) a signal conversion IC 3e (which may also be referred to as a video data receiver, a video data receiver unit, an activating signal transmitter, an activating signal transmitter unit, or a communication interface), (vi) a display 3f (display unit), (vii) a backlight 3g, (viii) a sound IC 3h, (ix) a speaker 3i, (x) an IF unit 3j, and (xi) an indicator 3k. Further, the communication IF unit 3c and the signal conversion IC 3e may each function not only as a receiver receiving data but also as a transmitter transmitting data; namely the communication IF unit 3c and the signal conversion IC 3e may each function as a transceiver communicating data.

The controller 3a is mainly composed of a MPU, executes a control program, and controls the overall operation of the meter apparatus 3. The control program executed by the controller 3a includes an activation program. The power supply circuit 3b supplies operating power to each functional block inside the meter apparatus 3. The communication IF unit 3c controls data communication with the display control ECU 2 via the in-vehicle network 4. The switch IF unit 3d detects the on/off of the ODO/TRIP switch 8 and outputs the detection result to the controller 3a. When the signal conversion IC 3e receives the video data transmitted from the display control ECU 2, the signal conversion IC 3e converts the received video data in accordance with the standard of the meter apparatus 3 and outputs the converted video data to the display 3f.

The display 3f is, for example, a TFT (Thin-Film-Transistor) liquid crystal display; when video data is received from the signal conversion IC 3e, the received video data is decoded and the video corresponding to the video data is displayed. The backlight 3g is turned on when a lighting on command is received from the controller 3a, and is turned off when a lighting off command is received from the controller 3a. When the sound IC 3h receives a sound output command from the controller 3a, the sound IC 3h outputs the sound from the speaker 3i according to the received sound output command. When the IF unit 3j receives a display command from the controller unit 3a, the IF unit 3j displays the indicator 3k according to the received display command.

The signal conversion IC 2e of the display control ECU 2 and the signal conversion IC 3e of the meter apparatus 3 are connected by a coaxial cable or a differential cable as a data communication line. The signal conversion IC 2e of the display control ECU 2 converts video data, serial data (UART, I2C, SPI, etc.) and general-purpose output data into high-speed serial signals. The converted high-speed serial signal is transmitted to the signal conversion IC 3e of the meter apparatus 3. When the signal conversion IC 3e of the meter apparatus 3 receives a high-speed serial signal from the signal conversion IC 2e of the display control ECU 2, the signal conversion IC 3e reconverts the received high-speed serial signal and separates the reconverted high-speed serial signal into video data, serial data, and general-purpose output data for output.

Further, the signal conversion IC 3e of the meter apparatus 3 converts the serial data and the general-purpose output data into a low-speed serial signal, and transmits the converted low-speed serial signal to the signal conversion IC 2e of the display control ECU 2. When the signal conversion IC 2e of the display control ECU 2 receives a low-speed serial signal from the signal conversion IC 3e of the meter apparatus 3, it reconverts the received low-speed serial signal and separates the reconverted low-speed serial signal into serial data and general-purpose output data for output.

The above configuration is a configuration in which the meter apparatus 3 does not have a GDC (Graphic Display Controller) and the display of videos in the meter apparatus 3 is controlled by the display control ECU 2. In such a configuration, as mentioned above, the following problems are assumed. That is, when the vehicle is stopped, both the display control ECU 2 and the meter apparatus 3 are in the sleep state. In a usage such as operating the ODO/TRIP switch 8 to check the mileage under the sleep state without starting the engine, simply activating the meter apparatus 3 fails to enable the display control ECU 2 to transmit the video data to the meter apparatus 3. Therefore, the mileage is not displayed on the meter apparatus 3. In view of this point, the following configuration is adopted in the present embodiment.

Figure 3:
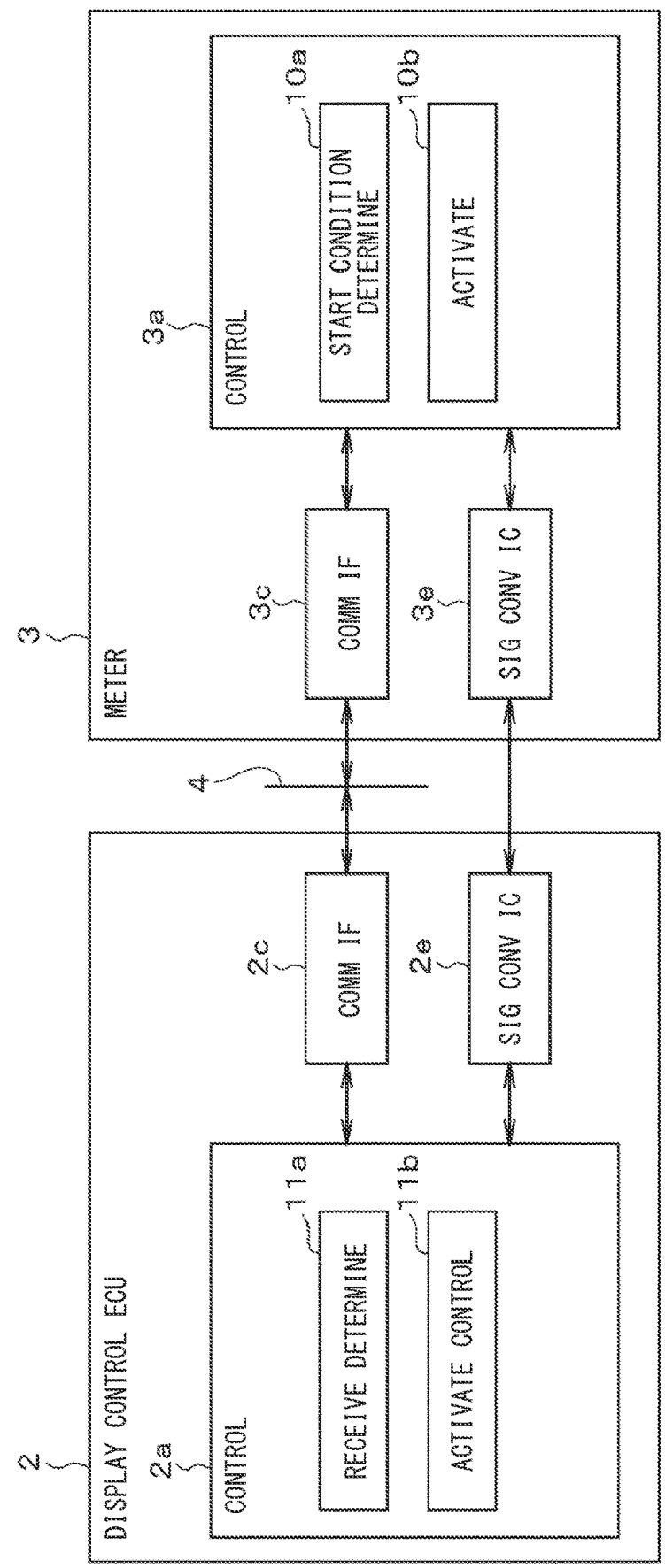
FIG. 3 is a diagram showing a configuration of a controller of a display control ECU and a controller of a meter apparatus.
Figure 4:
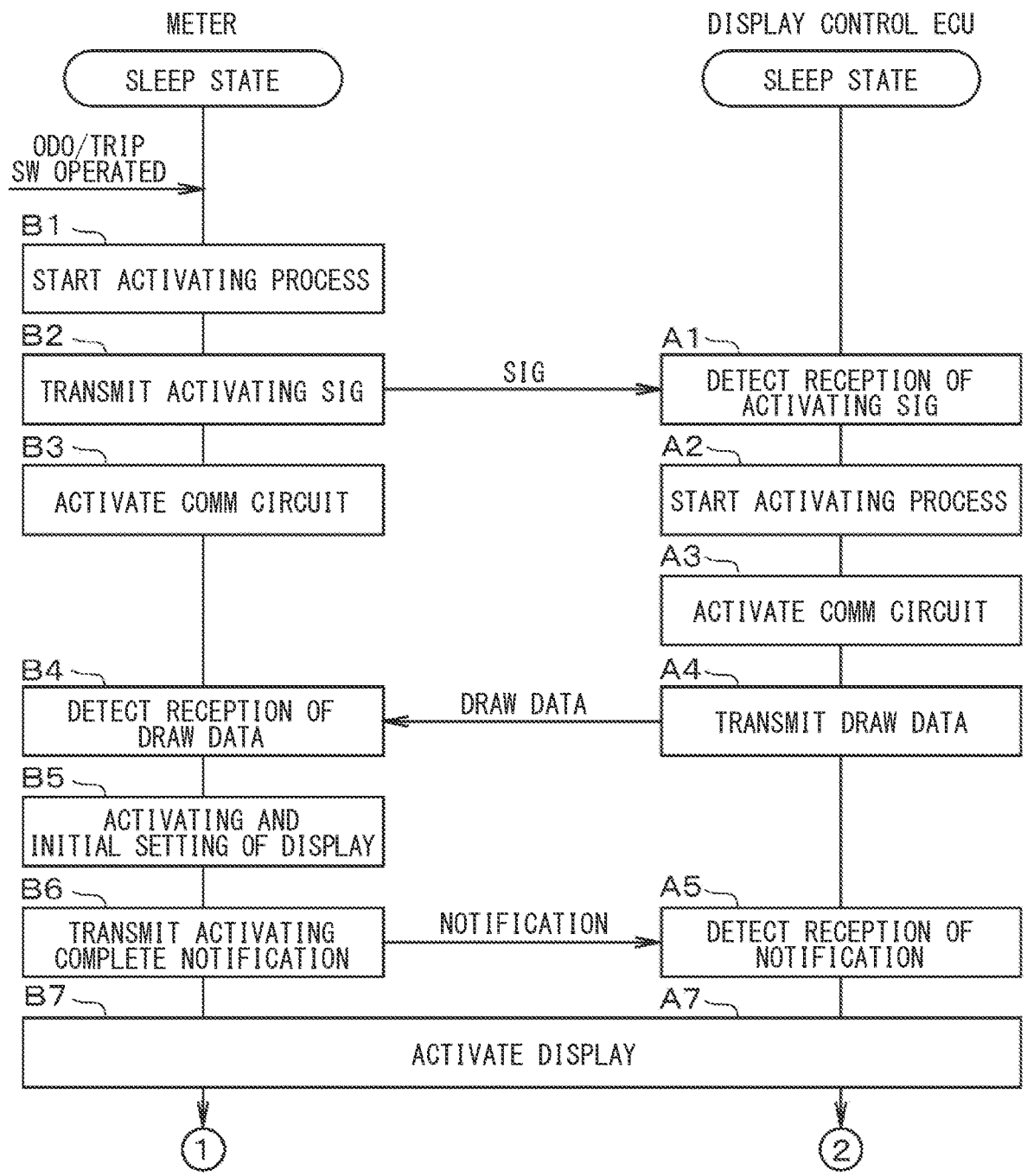
FIG. 4 is a diagram (No. 1) showing a sequence of a process when an ODO/TRIP switch is operated.
Figure 5:
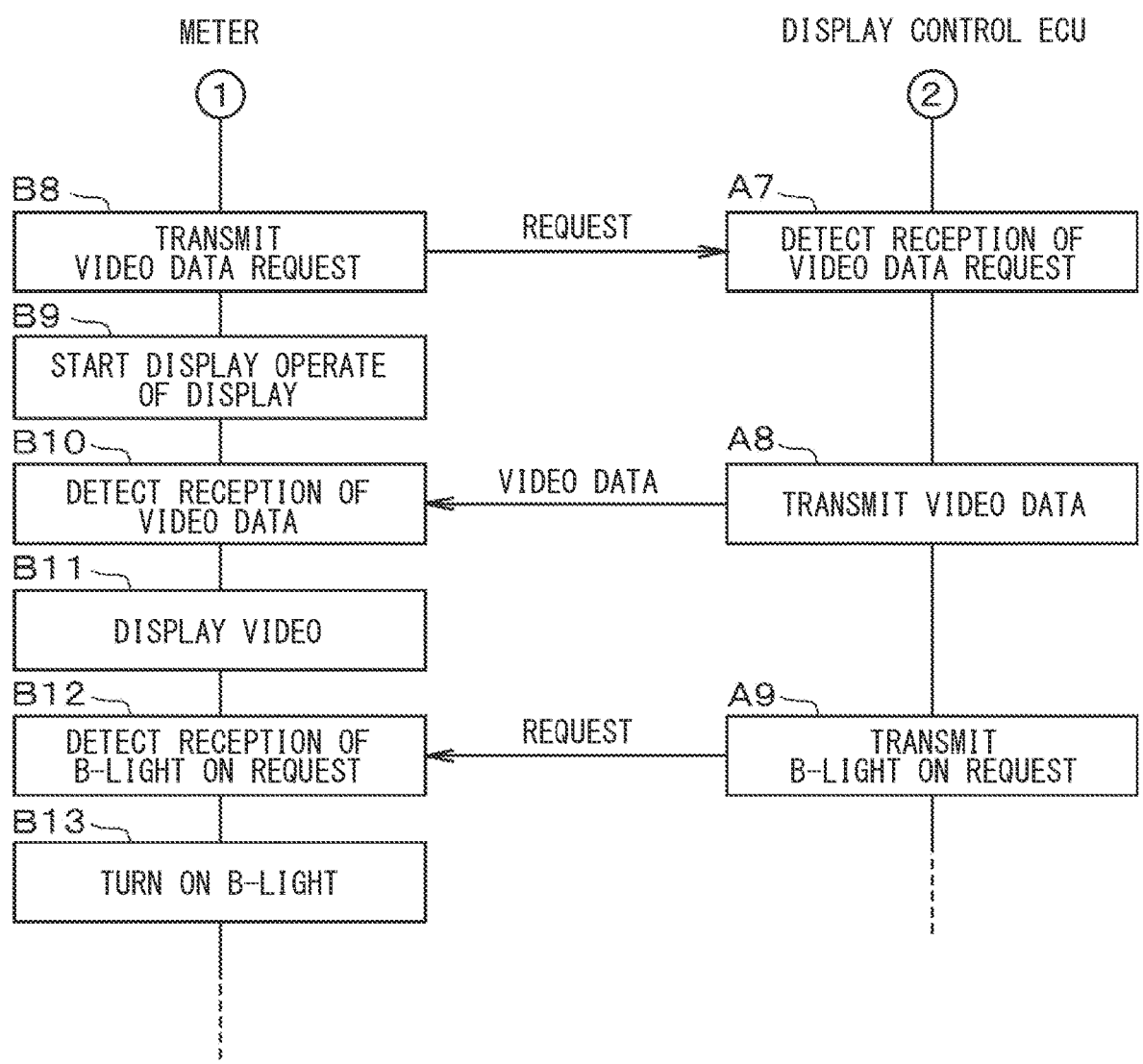
FIG. 5 is a diagram (No. 2) showing a sequence of a process when an ODO/TRIP switch is operated.

As shown in FIG. 3, in the meter apparatus 3, the controller 3a includes a start condition determination unit 10a and an activating unit 10b. The start condition determination unit 10a determines whether or not the ODO/TRIP switch 8 is operated, and determines whether or not the activating start condition is satisfied. When the start condition determination unit 10a determines that the ODO/TRIP switch 8 is operated and determines that the activating start condition is satisfied, the activating unit 10b transmits the activating signal from the communication IF unit 3c via the in-vehicle network 4 to the control ECU 2.

In the display control ECU 2, the controller 2a includes a reception determination unit 11a and an activating controller unit 11b. The reception determination unit 11a determines whether or not the activating signal from the meter apparatus 3 is received by the communication IF unit 2c via the in-vehicle network 4. When the reception determination unit 11a determines that the activating signal is received from the meter apparatus 3 by the communication IF unit 2c, the activating controller unit 11b activates the display control apparatus itself and enables the display control apparatus 2 to transmit the video data from the signal conversion IC 2e to the meter apparatus 3.

Next, the operation of the above configuration will be described with reference to FIGS. 4 to 7. In the meter apparatus 3, when the controller 3a detects the operation of the ODO/TRIP switch 8 under the state of monitoring the operation of the ODO/TRIP switch 8 in the sleep state (start condition determination procedure), the controller 3a starts the activating process (B1) and transmits the activating signal from the communication IF unit 3c to the in-vehicle network 4 (B2, activating procedure).

In the display control ECU 2, when the controller 2a detects the reception of the activating signal from the in-vehicle network 4 by the communication IF unit 2c under the state of monitoring the status of the in-vehicle network 4 (A1, reception determination procedure), the controller 2a starts the activating process (A2, activating control procedure), and starts the activating process of the communication circuit of the signal conversion IC 2e (A3). When the controller 2a completes the activating process of the communication circuit of the signal conversion IC 2e, the controller 2a transmits the drawing data from the signal conversion IC 2e to the meter apparatus 3 (A4). When the controller 2a transmits the drawing data from the signal conversion IC 2e to the meter apparatus 3, the controller 2a waits for the reception of the activating process completion notification from the meter apparatus 3. The drawing data, unlike the video data, is data required for the meter apparatus 3 to perform the activating process and the initial setting of the display 3f.

In the meter apparatus 3, when the controller 3a transmits the activating signal from the communication IF unit 3c to the in-vehicle network 4, the controller 3a starts the activating process of the communication circuit of the signal conversion IC 3e (B3). When the controller 3a completes the activating process of the communication circuit of the signal conversion IC 3e, the controller 3a waits for the reception of the drawing data from the display control ECU 2. When the controller 3a detects the reception of the drawing data from the display control ECU 2 by the signal conversion IC 3e (B4), the controller 3a starts the activating process and the initial setting of the display 3f (B5). The controller 3a then completes the activating process and the initial setting of the display 3f. Thereby, the controller 3a transmits the activating process completion notification from the signal conversion IC 3e to the display control ECU 2 (B6), and start the display activating process in cooperation with the display control ECU 2 (B7).

In the display control ECU 2, when the controller 2a detects the reception of the activating process completion notification from the meter apparatus 3 by the signal conversion IC 2e (A5), the controller 2a starts the display activating process in cooperation with the meter apparatus 3 (A6). When the controller 2a completes the display activating process, the controller 2a waits for the reception of the video data request from the meter apparatus 3.

In the meter apparatus 3, when the controller 3a completes the display activating process, the controller 3a transmits a video data request for the mileage from the signal conversion IC 3e to the display control ECU 2 (B8), starts the display operation of the display 3f (B9), and waits for the reception of the video data from the display control ECU 2 and waits for the reception of the backlight turning on request from the display control ECU 2.

In the display control ECU 2, when the controller 2a detects the reception of the video data request for the mileage from the meter apparatus 3 by the signal conversion IC 2e (A7), the controller 2a transmits the video data for the mileage from the signal conversion IC 2e to the meter apparatus 3 (A8), and transmits the back light turning on request from the signal conversion IC 2e to the meter apparatus 3 (A9).

In the meter apparatus 3, when the controller 3a detects the reception of the video data for the mileage from the display control ECU 2 by the signal conversion IC 3e (B10), the controller 3a displays the video corresponding to the received video data in the display 3f (B11). When the controller 3a detects the reception of the backlight turning on request from the display control ECU 2 by the signal conversion IC 3e (B12), the controller 3a turns on the backlight 3g (B13).

Figure 6:
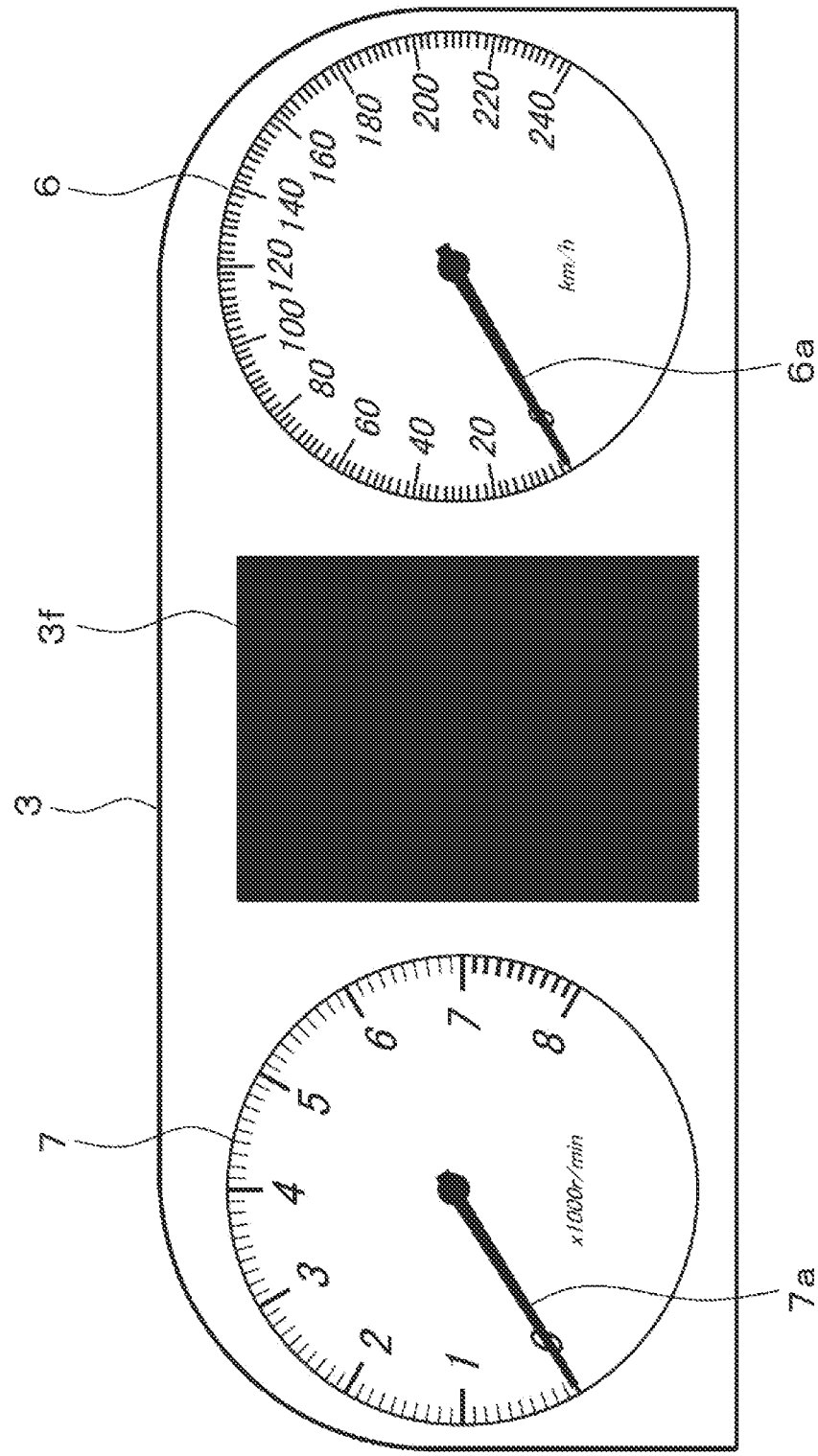
FIG. 6 is a diagram showing a screen image in a display when a meter apparatus is in a sleep state.
Figure 7:
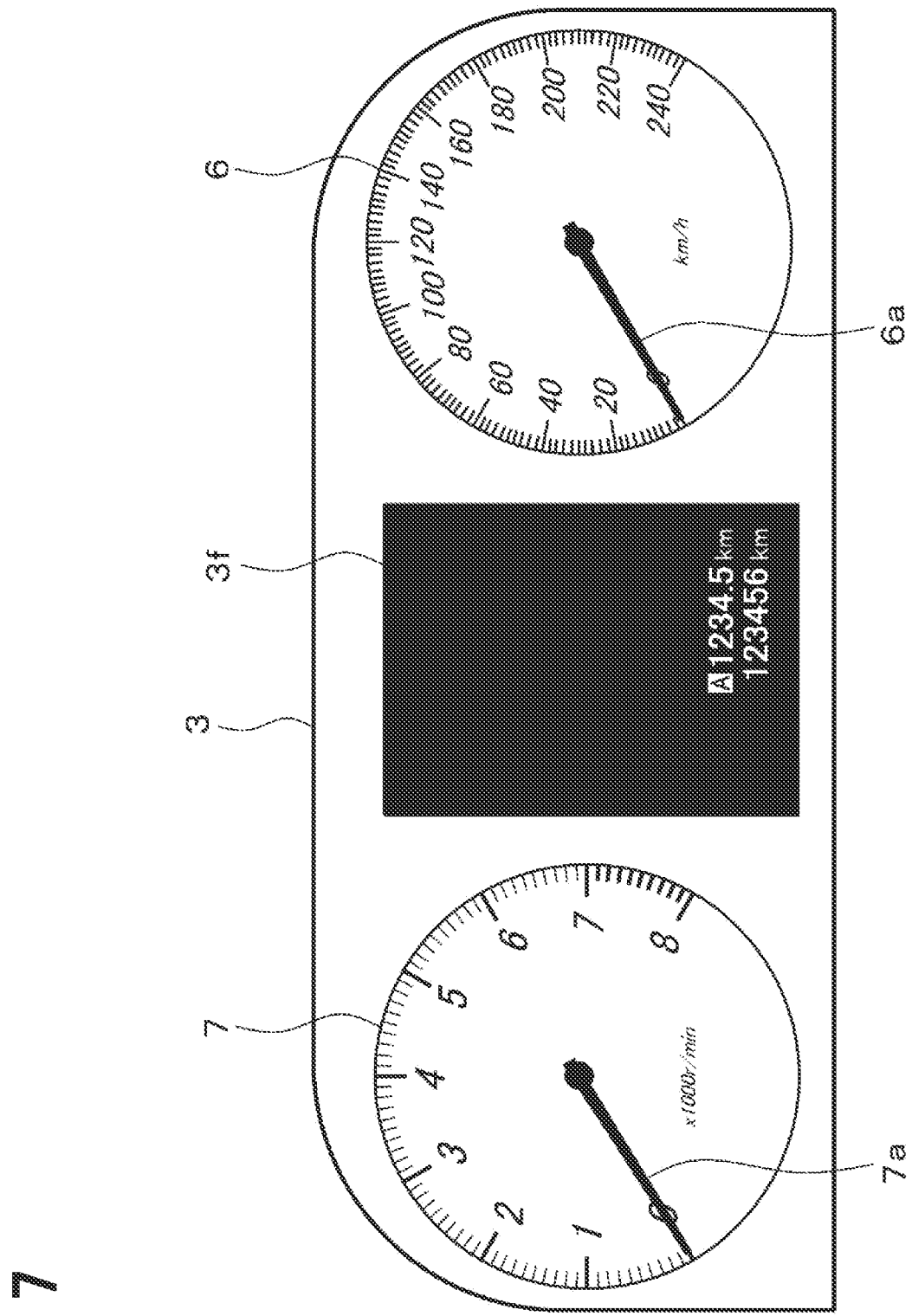
FIG. 7 is a diagram showing a screen image in a display when an ODO/TRIP switch is operated while a meter apparatus is in a sleep state.

That is, in the above series of processes, when the meter apparatus 3 detects the operation of the ODO/TRIP switch 8 in the sleep state, the meter apparatus 3 transmits an activating signal to the display control ECU 2 via the in-vehicle network 4 to activate the display control ECU 2. Thereby the display control ECU 2 is enabled to transmit the video data for the mileage to the meter apparatus 3. Therefore, in the sleep state, the meter apparatus 3 does not display a video on the display 3f as shown in FIG. 6. When the meter apparatus 3 however detects the operation of the ODO/TRIP switch 8, the meter apparatus 3 receives the video data for the mileage from the display control ECU 2. As a result, as shown in FIG. 7, the video of the mileage is displayed on the display 3f.

When the meter apparatus 3 detects the operation of the ODO/TRIP switch 8, at least the video for the mileage may be needed to be displayed on the display 3f. Further, in addition to the video for the mileage, the videos of the remaining amount of fuel and the integrated idling stop time, the integrated fuel saving fuel, and the like may be displayed on the display 3f. For example, a person in charge of a rental car business needs to know the mileage without starting the engine. In such a case, when the ODO/TRIP switch 8 is operated, the mileage can be recognized without starting the engine.

As described above, according to the first embodiment, the following effects can be obtained. When the meter apparatus 3 detects the operation of the ODO/TRIP switch 8, an activating signal is transmitted to the display control ECU 2 via the in-vehicle network 4 to activate the display control ECU 2. As a result, the display control ECU 2 can be appropriately activated by following the activation of the meter apparatus 3. Thereby, the display control ECU 2 can transmit the video data for the mileage to the meter apparatus 3, enabling the meter apparatus 3 to display the video for the mileage.

Second Embodiment

Next, the second embodiment will be described with reference to FIG. 8. The same parts as those in the first embodiment described above will be omitted, and different parts will be described. In the first embodiment, in the meter apparatus 3, the controller 3a transmits an activating signal to the display control ECU 2 via the in-vehicle network 4. In contrast, in the second embodiment, the controller 3a transmits an activating signal to the display control ECU 2 without passing through the in-vehicle network 4 (i.e., without using the in-vehicle network 4).

Figure 8:
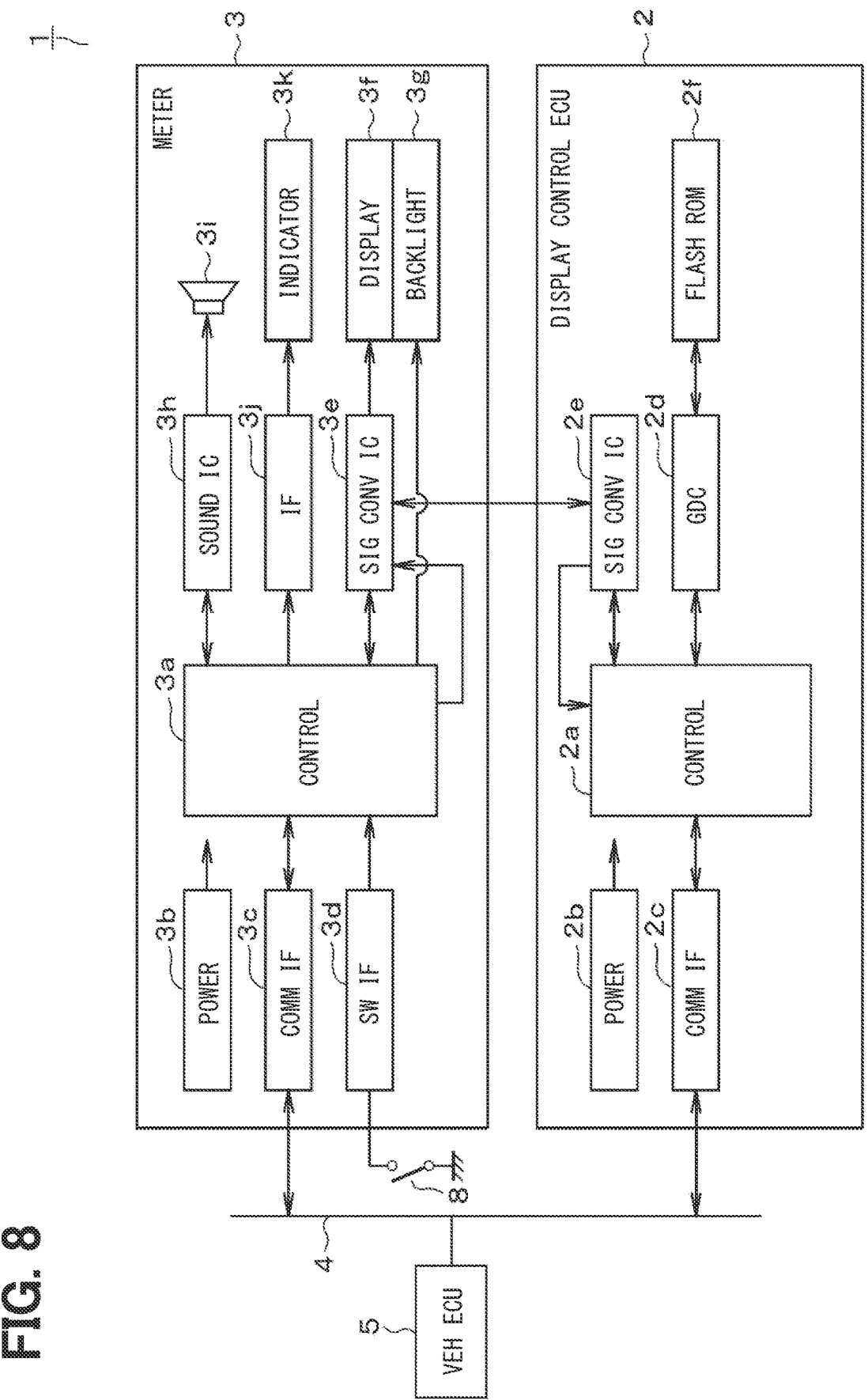
FIG. 8 is a functional block diagram showing an overall configuration of a second embodiment.

As shown in FIG. 8, in the meter apparatus 3, the controller 3a can output the activating signal transmission command to the signal conversion IC 3e. When the signal conversion IC 3e receives the activating signal transmission command from the controller 3a, the signal conversion IC 3e transmits the activating signal to the display control ECU 2 as general-purpose output data. That is, the controller 3a transmits the activating signal to the display control ECU 2 by using the signal conversion IC 3e and the data communication line through which the video data is communicated. In the display control ECU 2, when the signal conversion IC 2e receives the activating signal from the meter apparatus 3, the signal conversion IC 2e outputs an activating command to the controller 2a. When the controller 2a receives the activating command from the signal conversion IC 2e, the controller 2a starts the activating process.

In the above configuration, in the meter apparatus 3, when the controller 3a detects the operation of the ODO/TRIP switch 8 under the state of monitoring the operation of the ODO/TRIP switch 8 in the sleep state, the controller 3a starts the activating process, and starts the activating process of the communication circuit of the signal conversion IC 3e. When the controller 3a completes the activating process of the communication circuit of the signal conversion IC 3e, the controller 3a outputs an activating signal transmission command to the signal conversion IC 3e, and causes the signal conversion IC 3e to transmit the activating signal to the display control ECU 2.

In the display control ECU 2, the controller 2a completes the activating process of the communication circuit of the signal conversion IC 2e and detects the input of the activating command from the signal conversion IC 2e under the state of monitoring the input of the activating command from the signal conversion IC 2e. Thereby, the controller 2a starts the activating process. From this point onward, similarly described in the first embodiment described above, when the controller 2a detects the reception of the video data request for the mileage from the meter apparatus 3 by the signal conversion IC 2e, the controller 2a transmits the video data for the mileage from the signal conversion IC 2e to the meter apparatus 3, and transmits the back light turning on request from the signal conversion IC 2e to the meter apparatus 3.

In the meter apparatus 3, when the controller 3a detects the reception of video data for the mileage from the display control ECU 2 by the signal conversion IC 3e, the controller 3a displays the video corresponding to the received video data in the display 3f. When the controller 3a detects the reception of the backlight turning on request from the display control ECU 2 by the signal conversion IC 3e, the controller 3a turns on the backlight 3g.

As described above, according to the second embodiment, when the meter apparatus 3 detects the operation of the ODO/TRIP switch 8, an activating signal is transmitted to the display control ECU 2 without passing through the in-vehicle network 4 to activate the display control ECU 2. Therefore, the same effect as that of the first embodiment can be obtained. Further, the meter apparatus 3 does not unnecessarily activate the vehicle side ECU 5 connected to the in-vehicle network 4 (i.e., the vehicle side ECU 5 unrelated to displaying the video for the mileage. The power consumption of the entire system can thereby be reduced.

Third Embodiment

Next, a third embodiment will be described with reference to FIG. 9. The same parts as those of the second embodiment described above will be omitted, and different parts will be described. In the second embodiment, in the meter apparatus 3, the controller 3a transmits an activating signal to the display control ECU 2 from the signal conversion IC 3e. In contrast, in the third embodiment, the controller 3a directly transmits the activating signal to the display control ECU 2.

Figure 9:
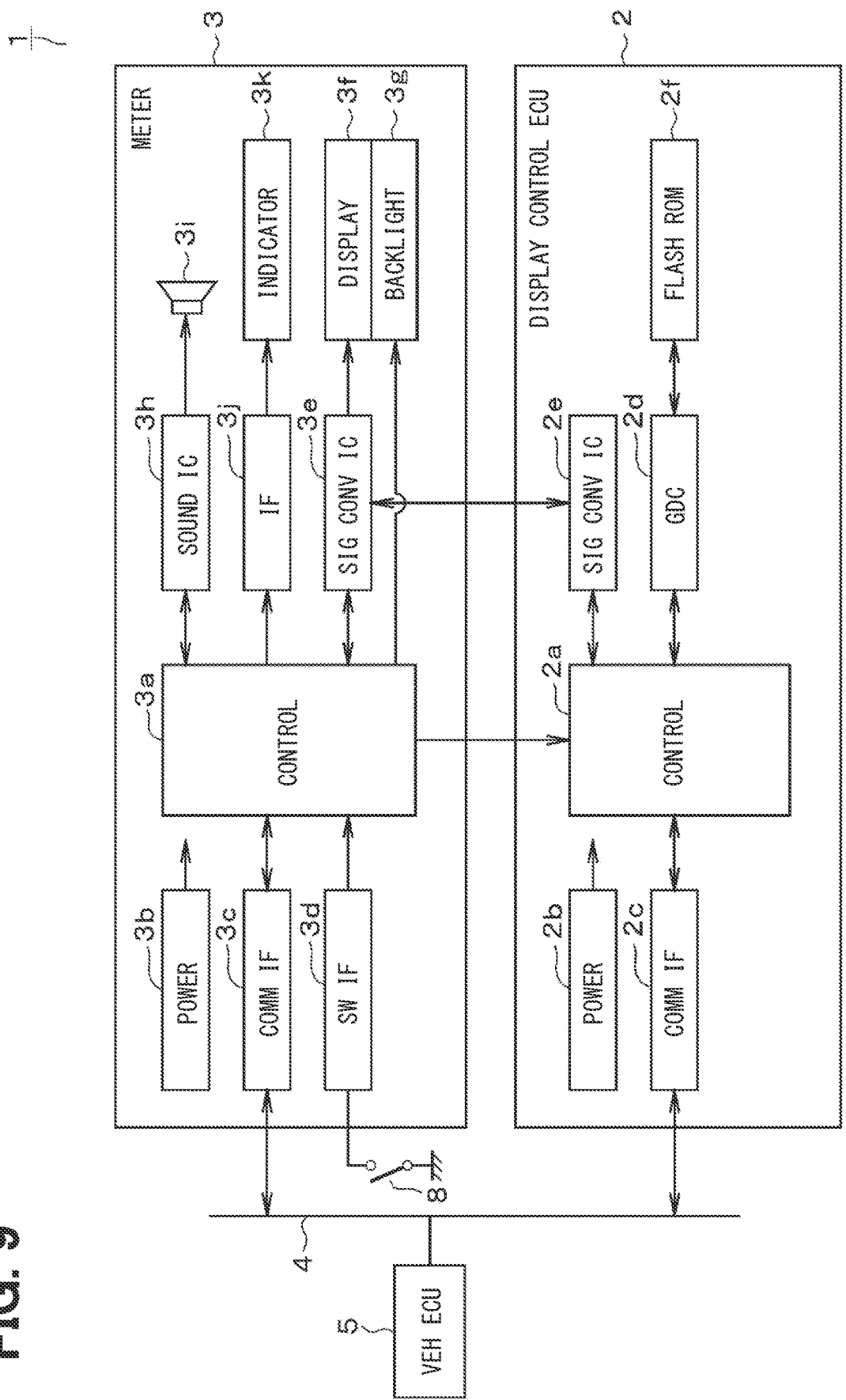
FIG. 9 is a functional block diagram showing an overall configuration of a third embodiment.

As shown in FIG. 9, the controller 2a of the display control ECU 2 and the controller 3a of the meter apparatus 3 are directly connected via a dedicated data communication line. In the meter apparatus 3, the controller 3a can directly transmit the activating signal to the display control ECU 2. The controller 3a switches the voltage level of the data communication line to transmit the activating signal to the display control ECU 2 via the data communication line. That is, the controller 3a transmits the activating signal to the display control ECU 2 by using a data communication line that is different from the data communication line through which the video data is communicated.

As described above, according to the third embodiment, when the meter apparatus 3 detects the operation of the ODO/TRIP switch 8, an activating signal is transmitted to the display control ECU 2 without passing through the in-vehicle network 4 to activate the display control ECU 2. Therefore, the same effect as that of the first embodiment can be obtained. Further, the meter apparatus 3 does not unnecessarily activate the vehicle side ECU 5 connected to the in-vehicle network 4 (i.e., the vehicle side ECU 5 unrelated to displaying the video for the mileage. The same effect as that of the second embodiment can thus be obtained.

Fourth Embodiment

Next, a fourth embodiment will be described with reference to FIG. 10. The same parts as those of the second embodiment described above will be omitted, and different parts will be described. In the fourth embodiment, in the meter apparatus 3, the controller 3a transmits an activating signal from a dedicated communication IF unit to the display control ECU 2.

Figure 10:
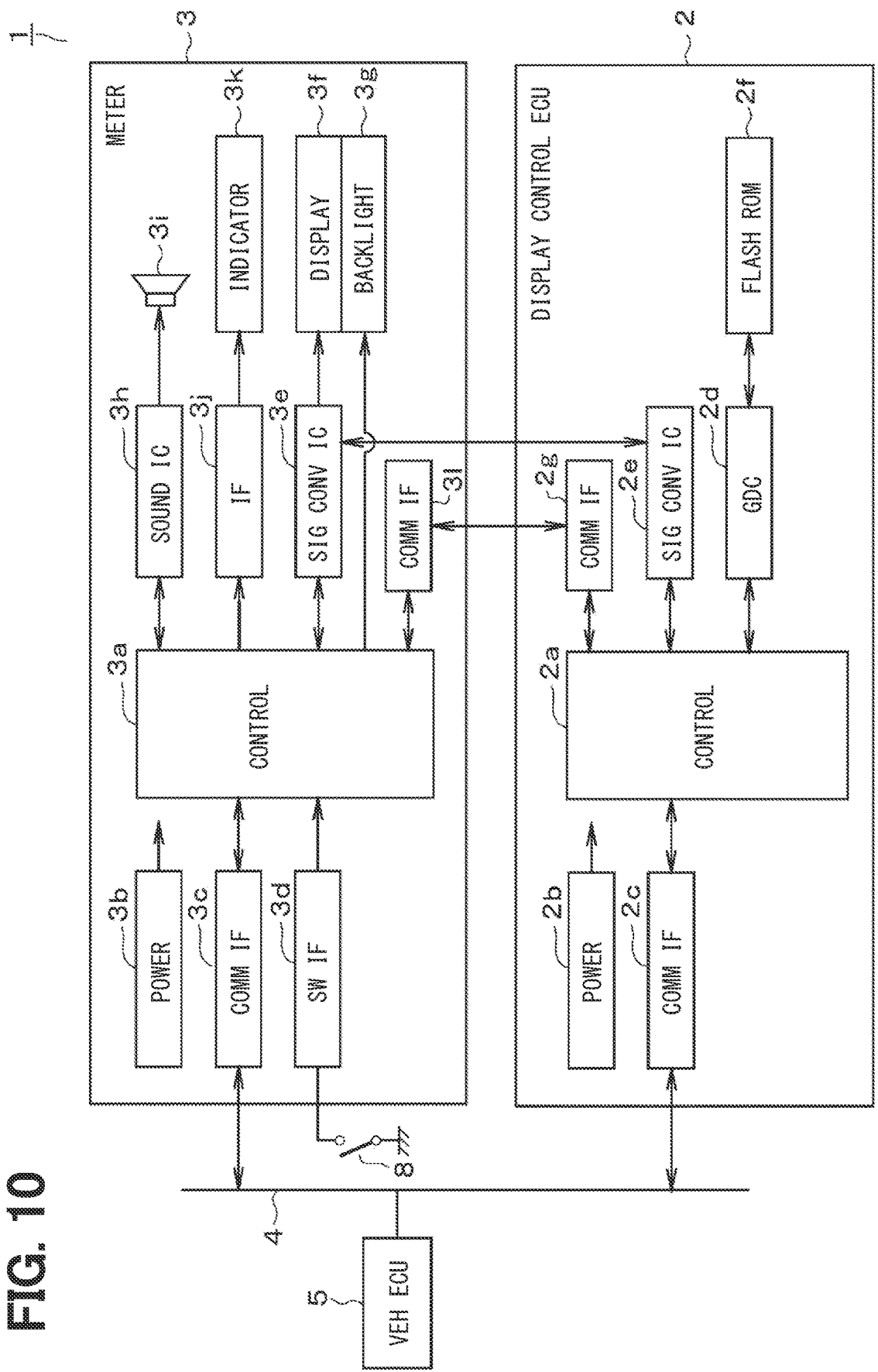
FIG. 10 is a functional block diagram showing an overall configuration of a fourth embodiment.

As shown in FIG. 10, the display control ECU 2 includes a communication IF unit 2g (which may also be referred to a communication interface) which controls data communication with the meter apparatus 3. The meter apparatus 3 includes a communication IF unit 3l (which may also be referred to a communication interface) which controls data communication with the display control ECU 2. When the controller 3a detects the operation of the ODO/TRIP switch 8 under the state of monitoring the operation of the ODO/TRIP switch 8 in the sleep state, the controller 3a starts the activating process, and starts the activating process of the communication circuit of the signal conversion IC 3e. When the controller 3a completes the activating process of the communication circuit of the signal conversion IC 3e, the controller 3a transmits the activating signal from the communication IF unit 3l to the display control ECU 2. That is, the controller 3a transmits the activating signal to the display control ECU 2 by using the communication IF unit 3l that is different from the signal conversion IC 3e.

As described above, according to the fourth embodiment, when the meter apparatus 3 detects the operation of the ODO/TRIP switch 8, an activating signal is transmitted to the display control ECU 2 to activate the display control ECU 2. Therefore, the same effect as that of the first embodiment can be obtained. Further, the meter apparatus 3 does not unnecessarily activate the vehicle side ECU 5 connected to the in-vehicle network 4 (i.e., the vehicle side ECU 5 unrelated to displaying the video for the mileage. The same effect as that of the second embodiment can thus be obtained.

Fifth Embodiment

Next, a fifth embodiment will be described with reference to FIG. 11. The same parts as those of the second embodiment described above will be omitted, and different parts will be described. In the fifth embodiment, in the meter apparatus 3, the controller 3a applies the power supply voltage of the display apparatus to the data communication line through which the video data is communicated, so that the activating signal is transmitted to the display control ECU 2.

Figure 11:
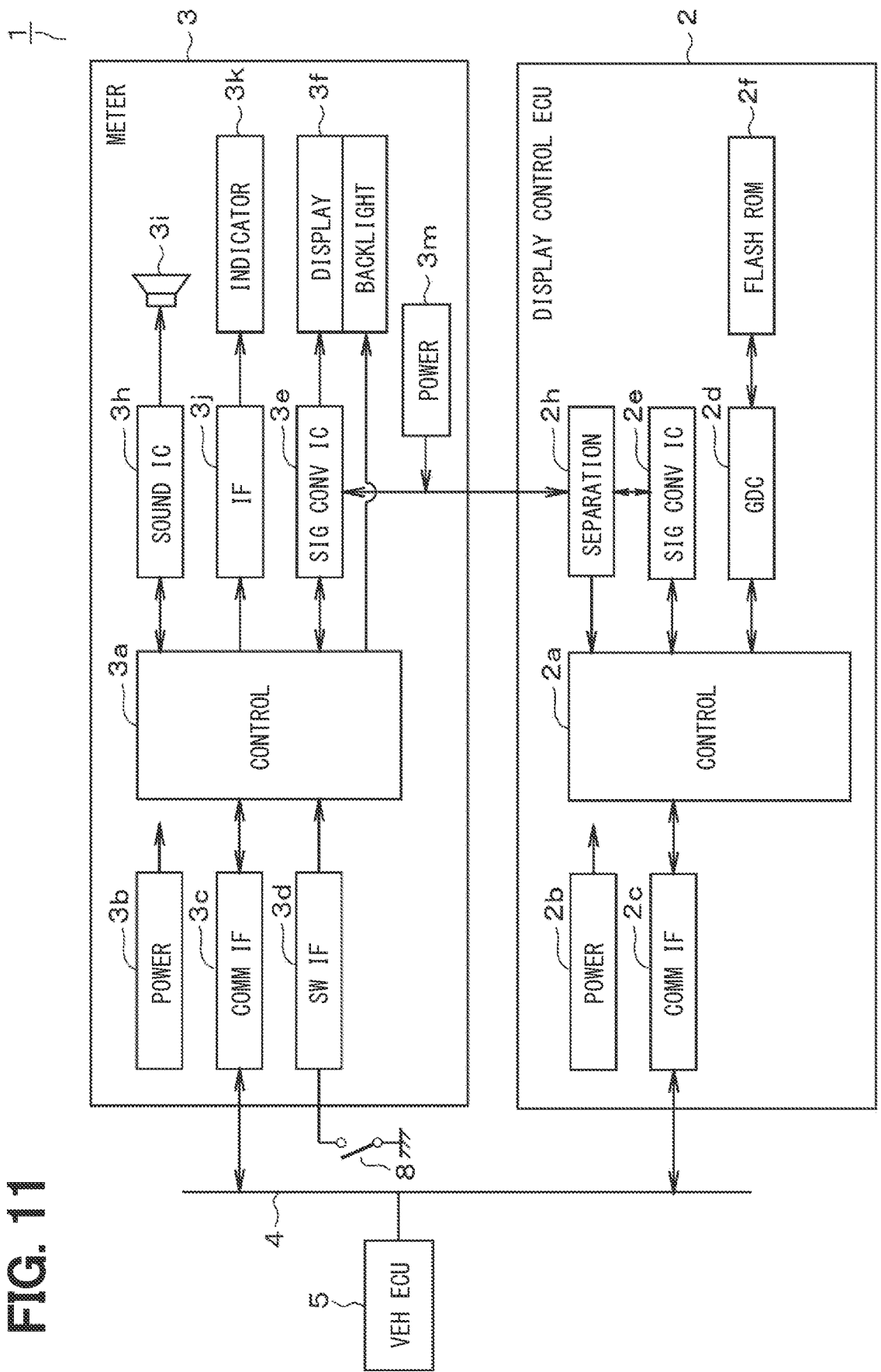
FIG. 11 is a functional block diagram showing an overall configuration of a fifth embodiment.

As shown in FIG. 11, the meter apparatus 3 includes a power supply circuit 3m. The display control ECU 2 includes a separation circuit 2h. When the controller 3a detects the operation of the ODO/TRIP switch 8 under the state of monitoring the operation of the ODO/TRIP switch 8 in the sleep state, the controller 3a starts the activating process, and starts the activating process of the communication circuit of the signal conversion IC 3e. Further, the controller 3a applies a power supply voltage from the power supply circuit 3m to the data communication line through which the video data is communicated. Further, the controller 3a applies a power supply voltage of the display control ECU 2 to the data communication line through which the video data is communicated. As a result, the activating signal is transmitted to the display control ECU.

When a power supply voltage is applied from the power supply circuit 3m to the data communication line through which the video data is communicated, the separation circuit 2h in the display control ECU 2 separates the activating signal and outputs an activating command to the controller 2a. When the controller 2a completes the activating process of the communication circuit of the signal conversion IC 2e and receives the activating command from the separation circuit 2h, the controller 2a starts the activating process.

As described above, according to the fifth embodiment, when the meter apparatus 3 detects the operation of the ODO/TRIP switch 8, an activating signal is transmitted to the display control ECU 2 to activate the display control ECU 2. Therefore, the same effect as that of the first embodiment can be obtained. Further, the meter apparatus 3 does not unnecessarily activate the vehicle side ECU 5 connected to the in-vehicle network 4 (i.e., the vehicle side ECU 5 unrelated to displaying the video for the mileage. The same effect as that of the second embodiment can thus be obtained.

Other Embodiments

Although the present disclosure has been described in accordance with the examples, it is understood that the present disclosure is not limited to such examples or structures. The present disclosure incorporates various modifications and variations within the scope of equivalents. Additionally, various combinations and configurations, as well as other combinations and configurations including more, less, or only a single element, are within the scope and spirit of the present disclosure.

As the display 3f of the meter apparatus 3, a TFT liquid crystal display that requires the backlight 3g has been exemplified. However, an organic EL (Electro Luminescence) display that does not require the backlight 3g may be adopted.

The controller, which may also be referred to as a controller circuit, such as the controller 2a, the controller 3a, and methods thereof described in the present disclosure in the above embodiments may be implemented by one or more special-purpose computers. Such computers may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer program may be stored, as an instruction executed by a computer, in a computer-readable non-transitory tangible storage medium.

For reference to further explain features of the present disclosure, the description is added as follows.

There is known a display control system including (i) a display apparatus with a display and (ii) a display control apparatus for controlling a video displayed on the display in the display apparatus.

In this type of display control system, when video data is transmitted from the display control apparatus to the display apparatus, the video corresponding to the video data is displayed on the display apparatus. For example, if the display apparatus is an in-vehicle meter apparatus, video data is transmitted from the display control apparatus to the meter apparatus, so that, for example, videos such as the remaining amount of fuel and the mileage are displayed on the meter apparatus.

When the vehicle is stopped, both the display control apparatus and the display apparatus are in the sleep state. In a configuration where a video data is transmitted from the display control apparatus to the display apparatus, and the video corresponding to the video data is thereby displayed on the display apparatus, the user may operate the ODO/TRIP switch to check the mileage without starting the engine. In such a usage, the video data is not transmitted from the display control apparatus to the display apparatus simply by activating the display apparatus. Therefore, the mileage is not displayed on the display apparatus, and the user cannot grasp the mileage. That is, in order for the mileage to be displayed on the display apparatus when the user operates the ODO/TRIP switch without starting the engine, it is necessary not only to activate the display apparatus but also to activate the display control apparatus.

It is thus desired to appropriately activate the display control apparatus by following the activation of the display apparatus in a configuration in which video data is transmitted from the display control apparatus to the display apparatus.

Aspects of the present disclosure described herein are set forth in the following clauses.

According to an aspect of the present disclosure, a display apparatus is provided to include a video data receiver, a display, an activating signal transmitter, a start condition determination unit, and an activating unit. The video data receiver is a receiver configured to receive a video data from a display control apparatus. The display is configured to display a video corresponding to the video data received by the video data receiver. The activating signal transmitter is a transmitter configured to transmit an activating signal to the display control apparatus. The start condition determination unit is configured to determine whether or not a start condition is satisfied. The activating unit is configured to activate the display control apparatus. Herein, in response to the start condition determination unit determining that the start condition is satisfied, the activating unit is further configured to cause the activating signal transmitter to transmit the activating signal to the display control apparatus to activate the display control apparatus.

Under the above configuration, when the activating start condition is satisfied, the activating signal is transmitted to the display control apparatus to activate the display control apparatus. As a result, the display control apparatus can be appropriately activated by following the activation of the display apparatus.

According to another aspect of the present disclosure, a display control apparatus is provided to include a video data transmitter, an activating signal receiver, a reception determination unit, and an activating controller unit. The video data transmitter is a transmitter configured to transmit a video data to a display apparatus. The activating signal receiver is a receiver configured to receive an activating signal from the display apparatus. The reception determination unit is configured to determine whether or not the activating signal is received by the activating signal receiver from the display apparatus. The activating controller unit is configured to activate the display control apparatus itself. Herein, in response to the reception determination unit determining that the activating signal is received from the display apparatus, the activating controller unit is further configured to activate the display control apparatus itself and cause the video data transmitter to transmit the video data to the display apparatus.

Under the above configuration, when the activating signal is received from the display apparatus, the display control apparatus itself is activated so that the video data can be transmitted to the display apparatus. As a result, the display control apparatus can be appropriately activated by following the activation of the display apparatus.

According to yet another aspect of the present disclosure, a display control system is provided to include a display apparatus and a display control apparatus. The display apparatus is configured to receive a video data from the display control apparatus and display a video corresponding to the received video data, and transmit an activating signal to the display control apparatus to activate the display control apparatus in response to determining that an activating start condition is satisfied. The display control apparatus is configured to activate the display control apparatus itself to enable the display control apparatus to transmit the video data in response to determining that the activating signal is received from the display apparatus. As a result, the display control apparatus can be appropriately activated by following the activation of the display apparatus.

What is claimed is:

1. A display apparatus enabled to be data communicably coupled to a display control apparatus via an in-vehicle network,
the display apparatus comprising:
a video data receiver being a receiver configured to receive a video data from the display control apparatus without using the in-vehicle network;
a display configured to display a video corresponding to the video data received by the video data receiver;
an activating signal transmitter being a transmitter configured to transmit an activating signal to the display control apparatus without using the in-vehicle network;
a start condition determination unit configured to determine whether or not a start condition is satisfied; and
an activating unit configured to activate the display control apparatus,
wherein:
in response to the start condition determination unit determining that the start condition is satisfied, the activating unit is further configured to cause the activating signal transmitter to transmit the activating signal to the display control apparatus without using the in-vehicle network, to activate the display control apparatus.

2. The display apparatus according to claim 1, wherein:
the activating signal transmitter is further configured to transmit the activating signal to the display control apparatus without using the in-vehicle network, by using a communication interface and a data communication line through which the video data is communicated.

3. The display apparatus according to claim 1, wherein:
the activating signal transmitter is further configured to transmit the activating signal to the display control apparatus without using the in-vehicle network, by using a different data communication line that is different from a data communication line through which the video data is communicated.

4. The display apparatus according to claim 1, wherein:
the activating signal transmitter is further configured to transmit the activating signal to the display control apparatus without using the in-vehicle network, by using a different communication interface that is different from a communication interface through which the video data is communicated.

5. The display apparatus according to claim 1, wherein:
the activating signal transmitter is further configured to transmit the activating signal to the display control apparatus without using the in-vehicle network, by applying a power supply voltage of the display apparatus to a data communication line through which the video data is communicated.

6. The display apparatus according to claim 1, further comprising:
a controller communicably coupled to the video data receiver, the display, the activating signal transmitter, the controller being configured to implement the start condition determination unit and the activating unit.

7. The display apparatus according to claim 6, wherein the controller includes a processor and memory configured to implement the start condition determination unit and the activating unit.

8. A display control apparatus enabled to be data communicably coupled to a display apparatus via an in-vehicle network,
the display control apparatus comprising:
a video data transmitter being a transmitter configured to transmit a video data to the display apparatus without using the in-vehicle network;
an activating signal receiver being a receiver configured to receive an activating signal from the display apparatus without using the in-vehicle network;
a reception determination unit configured to determining whether or not the activating signal is received by the activating signal receiver from the display apparatus without using the in-vehicle network; and an activating controller unit configured to activate the display control apparatus itself, wherein:

in response to the reception determination unit determining that the activating signal is received from the display apparatus without using the in-vehicle network, the activating controller unit is further configured to activate the display control apparatus itself and cause the video data transmitter to transmit the video data to the display apparatus without using the in-vehicle network.

9. The display control apparatus according to claim 8, further comprising:

a controller communicably coupled to the video data transmitter, and the activating signal receiver, the controller being configured to implement the reception determination unit and the activating controller unit.

10. The display control apparatus according to claim 9, wherein the controller includes a processor and memory configured to implement the reception determination unit and the activating controller unit.

11. A display control system comprising:

a display apparatus; and a display control apparatus that is data communicably coupled to the display apparatus via an in-vehicle network, wherein:

the display apparatus is configured to
receive a video data from the display control apparatus without using the in-vehicle network, and
display a video corresponding to the received video data;

the display apparatus is further configured to
transmit an activating signal to the display control apparatus without using the in-vehicle network to activate the display control apparatus in response to determining that an activating start condition is satisfied; and the display control apparatus is configured to activate the display control apparatus itself to enable transmitting the video data without using the in-vehicle network in response to determining that the activating signal is received from the display apparatus without using the in-vehicle network.

12. A non-transitory computer readable storage medium storing an activation computer program product to a controller in a display apparatus enabled to be data communicably coupled to a display control apparatus via an in-vehicle network, the display apparatus being configured to receive a video data from the display control apparatus without using the in-vehicle network to display a video corresponding to the receive video data in a display, the activation computer program product comprising instructions configured to, when executed by at least one processor in the controller, cause the at least one processor to:

determine whether or not a start condition is satisfied; and activate the display control apparatus by transmitting an activating signal to the display control apparatus without using the in-vehicle network, in response to determining that the start condition is satisfied.

13. A non-transitory computer readable storage medium storing an activation control computer program product to a controller in a display control apparatus enabled to be data communicably coupled to a display apparatus via an in-vehicle network, the display control apparatus being configured to transmit a video data to the display apparatus without using the in-vehicle network, the activation control program product comprising instructions configured to, when executed by at least one processor in the controller, cause the at least one processor to:

determine whether or not an activating signal is received from the display apparatus without using the in-vehicle network; and activate the display control apparatus and cause the display control apparatus to transmit the video data to the display apparatus without using the in-vehicle network, in response to determining that the activating signal is received from the display apparatus without using the in-vehicle network.

* * * * *